April 11, 1961 O. BEREZNAI 2,978,904
TRACK INSPECTION CAR
Filed Sept. 18, 1956 19 Sheets-Sheet 1

INVENTOR
OSZKAR BEREZNAI
BY Irvin S. Thompson
ATTORNEY

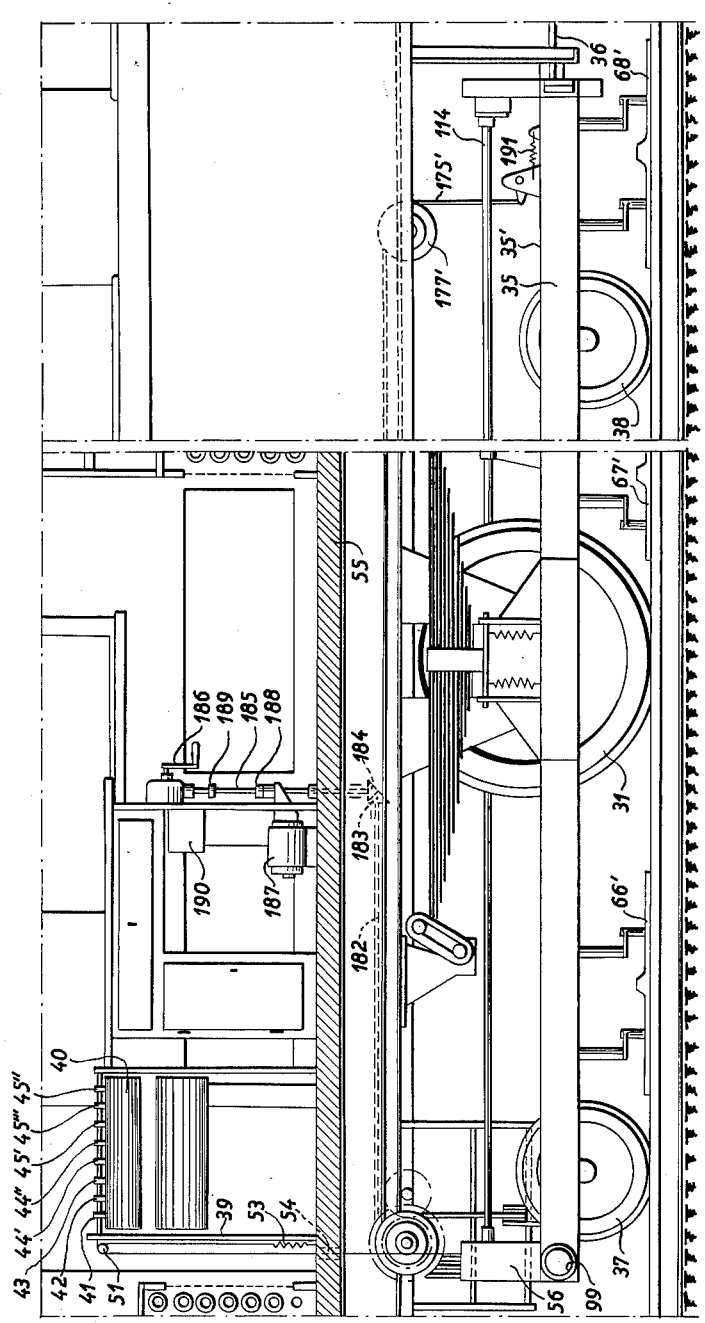

April 11, 1961  O. BEREZNAI  2,978,904
TRACK INSPECTION CAR
Filed Sept. 18, 1956  19 Sheets-Sheet 3
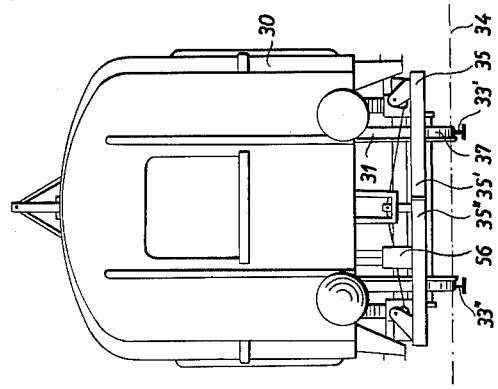
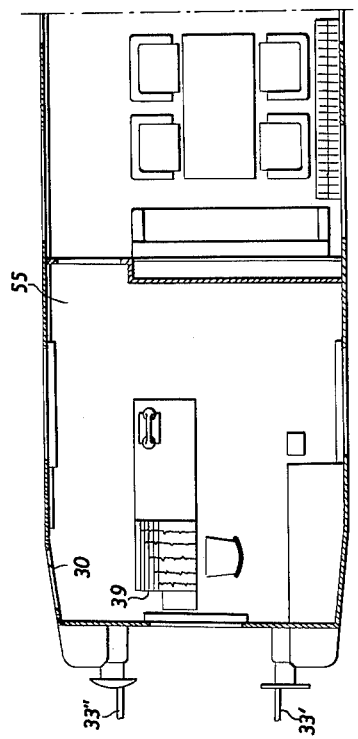
INVENTOR
OSZKAR BEREZNAI
BY
ATTORNEY

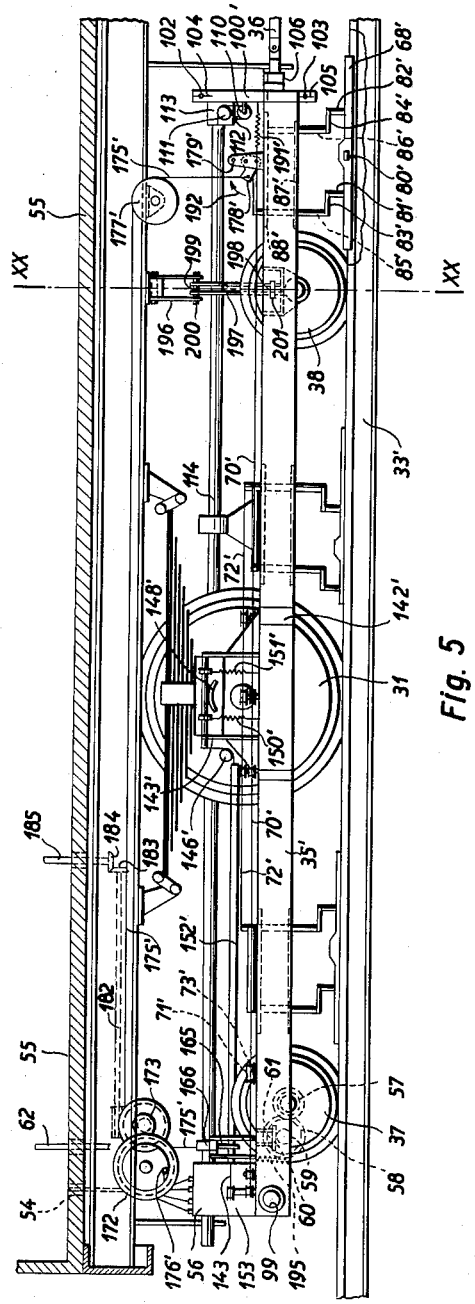

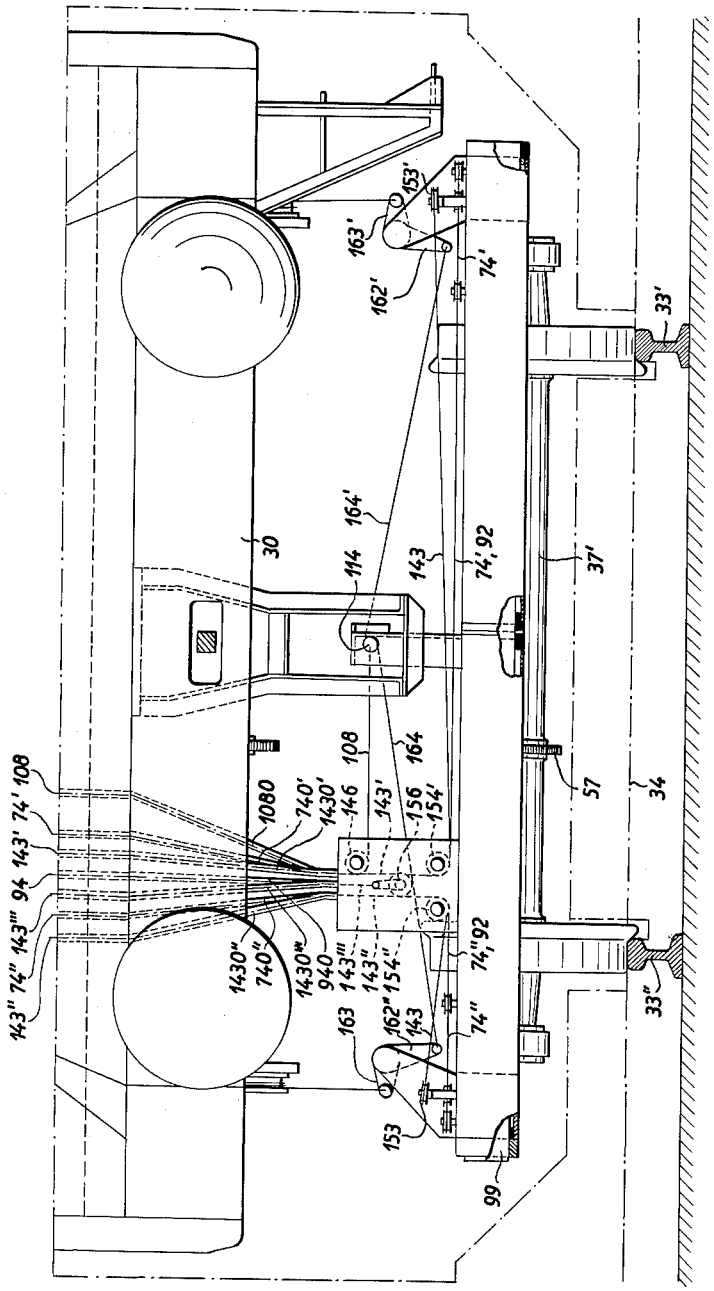

April 11, 1961     O. BEREZNAI     2,978,904
TRACK INSPECTION CAR
Filed Sept. 18, 1956     19 Sheets-Sheet 10

INVENTOR
OSZKAR BEREZNAI
BY *Irvin S. Thompson*
ATTORNEY

April 11, 1961    O. BEREZNAI    2,978,904
TRACK INSPECTION CAR

Filed Sept. 18, 1956    19 Sheets-Sheet 12

INVENTOR
OSZKAR BEREZNAI
BY Irvin S. Thompson
ATTORNEY

April 11, 1961  O. BEREZNAI  2,978,904
TRACK INSPECTION CAR
Filed Sept. 18, 1956  19 Sheets-Sheet 13
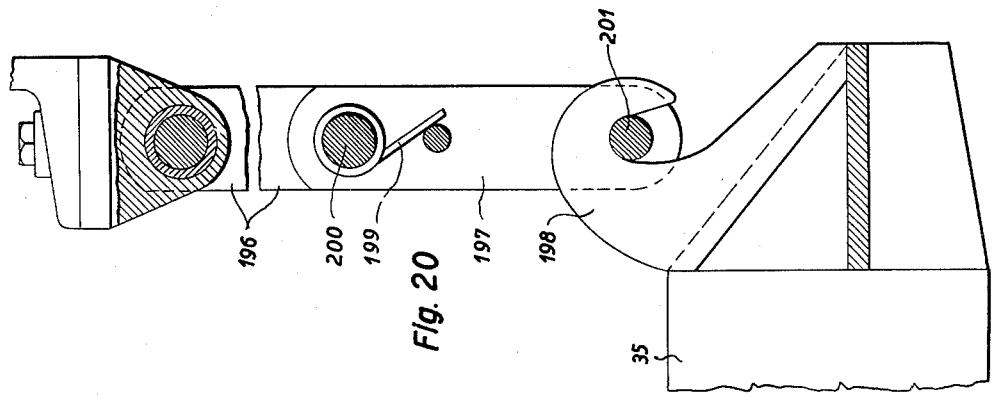
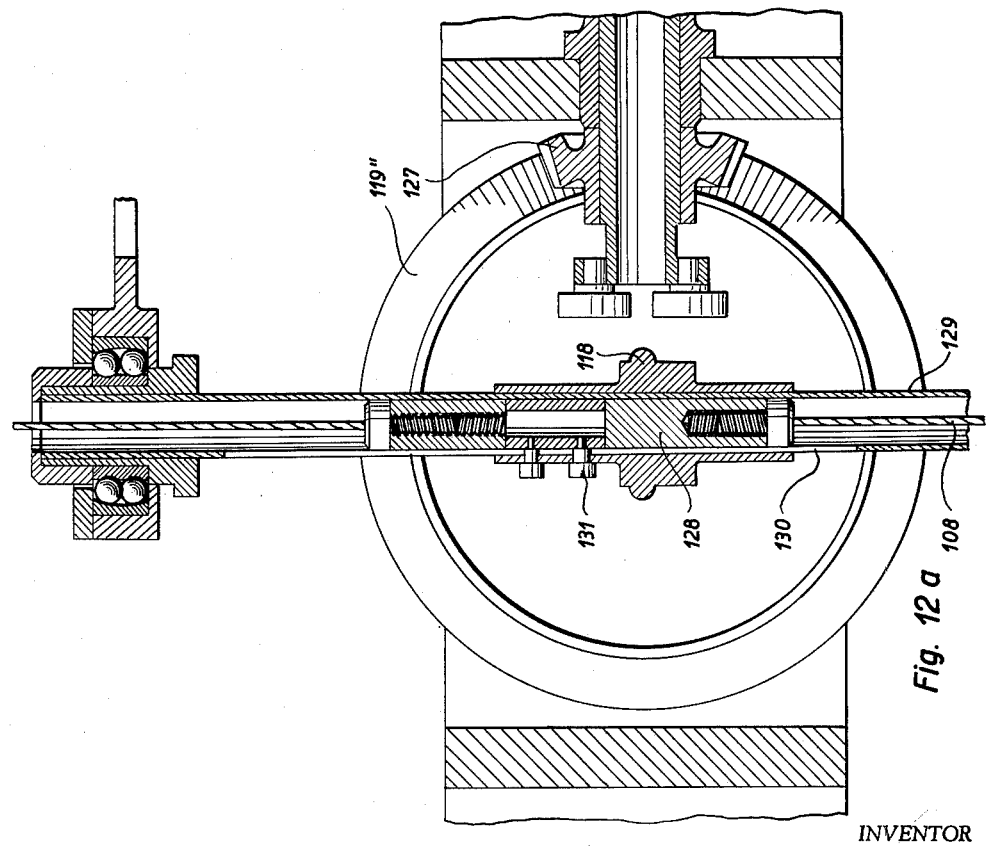
INVENTOR
OSZKAR BEREZNAI
BY Irwin S. Thompson
ATTORNEY April 11, 1961    O. BEREZNAI    2,978,904
TRACK INSPECTION CAR
Filed Sept. 18, 1956    19 Sheets-Sheet 15
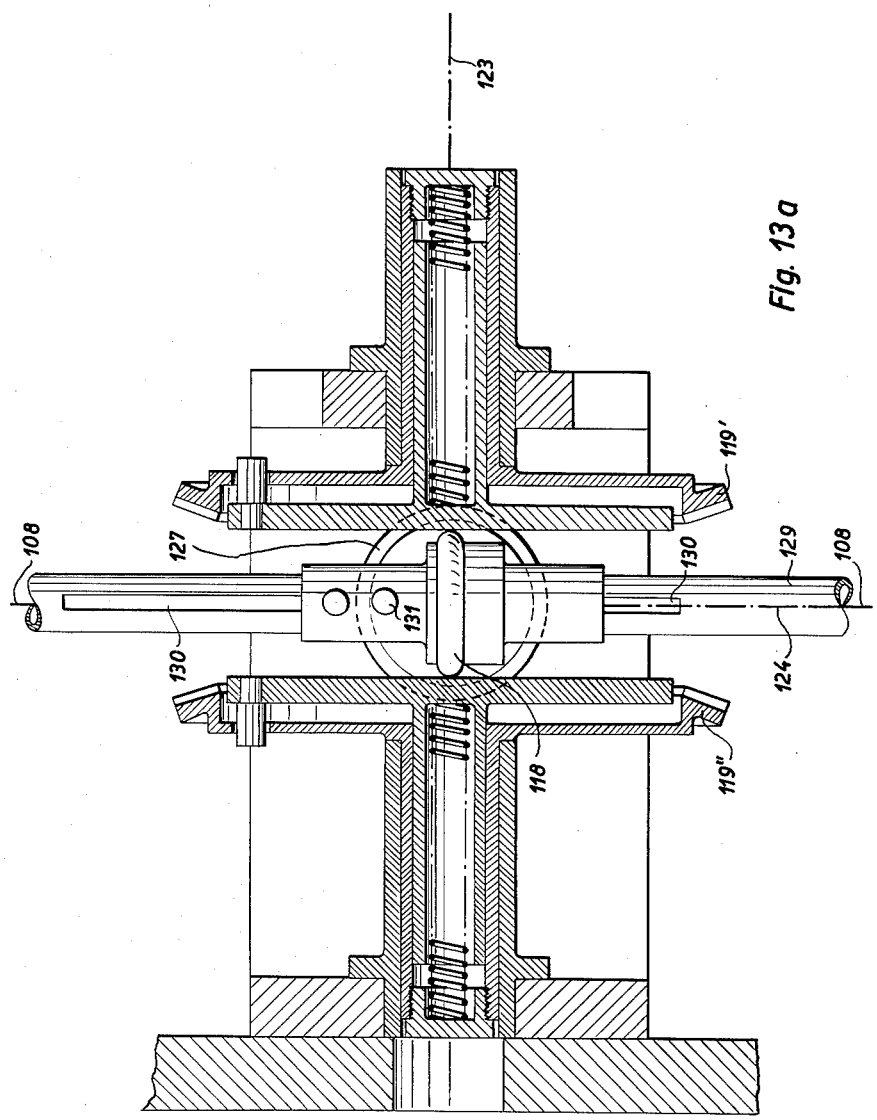
INVENTOR
OSZKAR BEREZNAI
BY
ATTORNEY April 11, 1961 O. BEREZNAI 2,978,904
TRACK INSPECTION CAR
Filed Sept. 18, 1956 19 Sheets-Sheet 16

INVENTOR
OSZKAR BEREZNAI
BY Irwin S. Thompson
ATTORNEY

April 11, 1961     O. BEREZNAI     2,978,904

TRACK INSPECTION CAR

Filed Sept. 18, 1956     19 Sheets-Sheet 19

INVENTOR

OSZKAR BEREZNAI

BY

ATTORNEY

United States Patent Office 2,978,904
Patented Apr. 11, 1961

2,978,904

TRACK INSPECTION CAR

Oszkar Bereznai, Budapest, Hungary, assignor to Licencia Találmányokat Értékesitő Vállalat, Budapest, Hungary Filed Sept. 18, 1956, Ser. No. 610,521

Claims priority, application Hungary Sept. 21, 1955

7 Claims. (Cl. 73—146)

This invention relates to a track recording vehicle comprising a running gear and a vehicle body.

As known, track recording vehicles are used to measure characteristic data which determine the physical state of the track. They relate to horizontal as well as vertical quantities which are explored and transmitted to a recording instrument located in the vehicle body. The most important of these data in the horizontal direction are the radii of curvature, irregularities in rail alignment and the gauge of the track, and, in the vertical direction, static and dynamic irregularities in cross level and the cant of the track.

According to a well known proposal these data are ascertained by recording, on the one hand the movements of a pair of wheels mounted on a single axle between two six-wheeled bogies and, on the other hand, the movements of one of the six-wheeled bogies themselves. To ensure freedom from error in making the measurements the creation of the largest possible deflections is aimed at. According to another well known proposal the central single axle with one pair of wheels is replaced by a bogie with several axles. It has also been proposed to base the measurements on the deflections of one of the bogies of a track recording vehicle running on two six-wheeled bogies. In the two latter cases the position of the rails is at the same time explored by track sensing members.

It will be apparent that these known types of track recording vehicles resemble each other in possessing at least two bogies. A further feature common to them all is that they use gyroscopic systems to determine irregularities in cross level and superelevation. However, bogie vehicles and gyroscopic equipment are expensive items and the capital cost of track recording vehicles is therefore not inconsiderable.

It is the object of the present invention to provide a track recording vehicle of simple construction and moderate cost without impairing the accuracy of the recorded results. According to the invention this is achieved by ascertaining the desired data at least partly from the behaviour of a measuring carriage which runs on cylindrical track wheels and is arranged to be entrained with freedom of movement under the vehicle body. The employment of such a measuring carriage permits the recording vehicle itself to be constructed in the form of a four-wheeled track recording vehicle because its own running gear is not utilised for measuring purposes and may therefore be of optional design.

The provision of the measuring carriage also offers the advantage of permitting the elimination of gyroscopic equipment and this is rendered possible in a very simple way. As known, the gyroscopes in a track recording vehicle serve to provide an artificial reference horizon for the determination of static irregularities in cross level and of the super-elevation of the track. If it were possible to measure these irregularities and the superelevation by direct means gyroscopic reference levels would be unnecessary. Now, it can be shown that the line of the upper edge of the rail including the superelevated sections and the ramps on either side which lead up to maximum cant can be regarded as being the integral curve of a differential curve which characterises the relative vertical level of the two rails. If the differential curve is known, the corresponding integral curve can be obtained by integration of the differential values. A measuring carriage incorporated in a track recording vehicle according to the present invention can be readily used to measure the relative vertical level of the two rails if it is subdivided into two members that are adapted to be angularly deflected about a common transverse axis and if the carriage is mounted unsprung on its axles so that the divided members of the carriage can adapt themselves freely to the varying relative vertical levels of the rails. The relative deflection of the two members of the carriage is therefore a measure of the relative vertical level of the rails. The curve representing this deflection as recorded by the recording instrument is therefore the required differential curve which at the same time shows the static variations in cross level. When integrating this differential curve the resultant integral curve will represent the superelevation.

The measuring carriage can further be used to measure the dynamic irregularities in the level of each rail and the consequent variations in cross level. To this end the measuring carriage cooperates with one of the single axles of the track recording vehicle, the measuring carriage providing the reference system for the dynamic level of the rails. The relative movements of the axle bearings of the pair of running wheels cooperating with the measuring carriage will then provide a measure of the dynamic irregularities in the level of each rail. To form the differences between coordinated measured values for the determination of the cross level, the measured values are compared.

Since the radii of curvature, irregularities in rail alignment and variation in gauge are conveniently explored by a feeler device on the measuring carriage, a measuring carriage according to the present invention provides a comparatively simple means of measuring the most important data in railway tracks independently of the nature of the recording vehicle itself, without the need of using gyroscopic devices, with a high degree of accuracy.

Further details will be described with reference to the drawings which show an illustrative form of construction of a track recording vehicle according to the invention.

Fig. 1 is a front view of the vehicle, part of which is shown on an enlarged scale in Fig. 1a.

Fig. 2 is a side view of the vehicle shown in Fig. 1.

Fig. 3 is a section taken on the line III—III in Fig. 1.

Fig. 5 is a side view of the carriage according to Fig. 4;

Fig. 6 is an end-on view of the carriage according to Fig. 4;

Figs. 12 and 12a are a side view of the recording set and of a part of the same respectively;

Figs. 13 and 13a are a front view of the set according to Fig. 12;

Fig. 20 is a detail in section taken on the line XX—XX in Fig. 5.

Similar reference numerals in different drawings indicate similar parts, corresponding or homologic parts being indicated by a single or double-quote index mark against the relative numeral.

Figure 1:
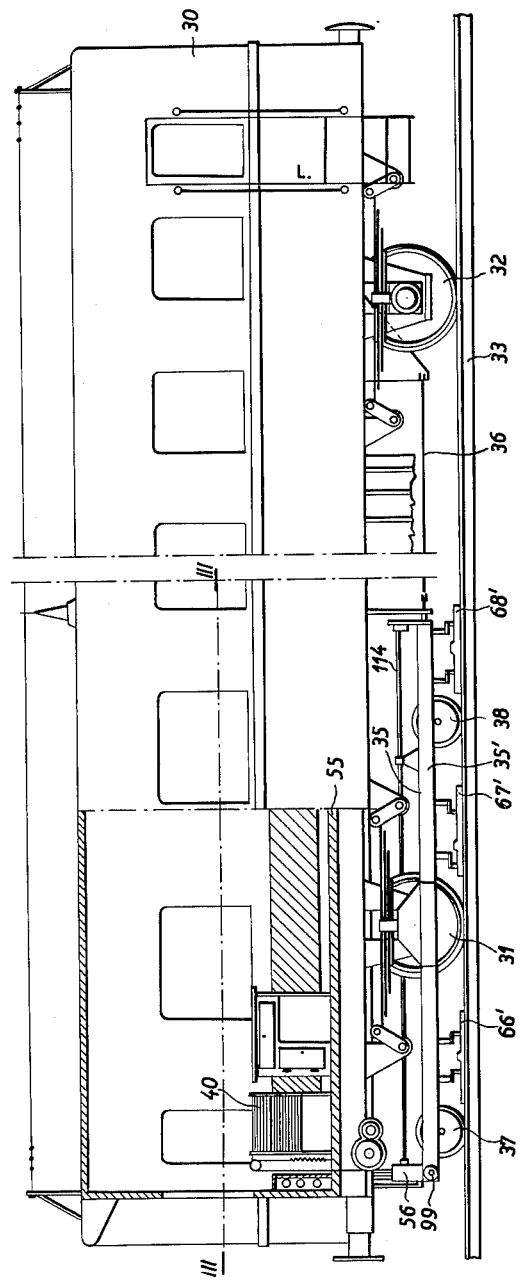

As shown in Fig. 1, the illustrated example of a track recording vehicle according to the invention is a vehicle with a body 30 mounted on running gear comprising two pairs of wheels 31 and 32. These wheels run on the track, the individual rails of which are indicated by 33' and 33''. The track level is shown by a straight line 34 represented by and placed across the tops of the rails 33' and 33''.

Beneath the body 30 of the vehicle is the measuring carriage 35 according to the invention which runs freely underneath the vehicle 30, 31, 32 and is attached to the same by a draw bar 36 linked at one end to the vehicle body 30 and, at the other end to the carriage 35. The measuring carriage runs on two pairs of cylindrical running wheels 37 and 38. The characteristic track data determined with the help of the measuring carriage are transmitted in the illustrative form of construction to a recording set 39 located inside the vehicle body 30, the flexible transmission cables between the measuring carriage 35 and the vehicle body being embodied in Bowden cables. Relative movement between the measuring carriage and the vehicle body is not therefore transmitted to the recording set, and cannot affect the recordings.

Figure 10:
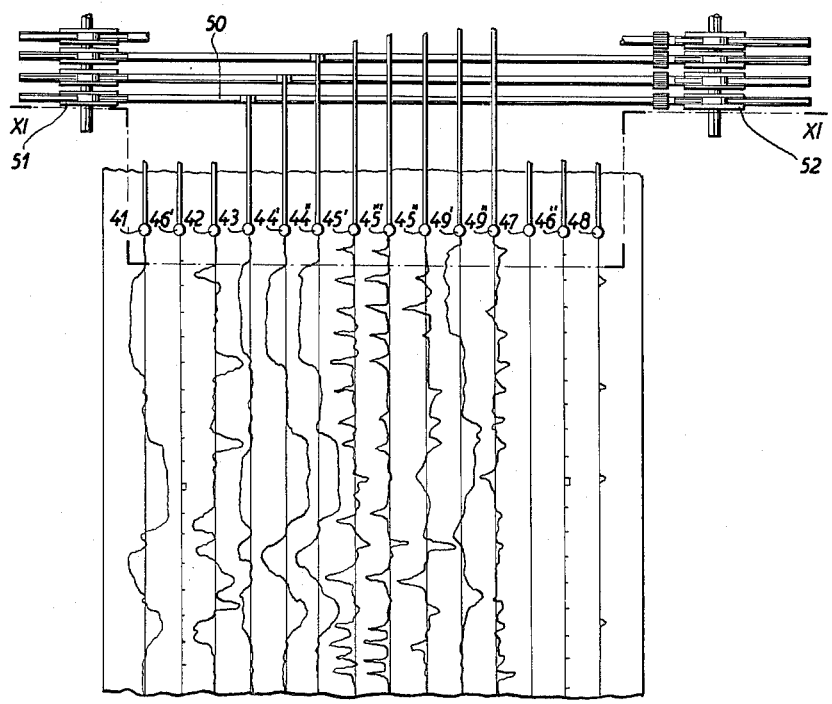
Fig. 10 is a plan view of a detail of the recording set.
Figure 11:
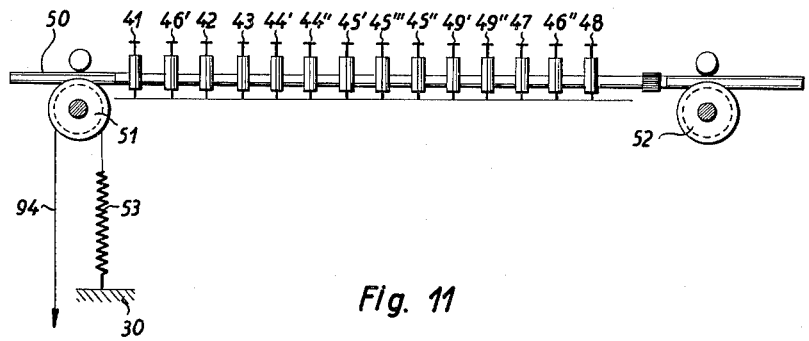
Fig. 11 is a front view of the detail shown in Fig. 10.

The recording set 39 as such comprises a conventional transporting or paper drum 40 which is driven at a speed which depends upon the speed of the vehicle. The various recording pens relating to the different measured quantities write on the circumferential surface of the paper drum 40, their deflections being proportional to the values of the measured quantities and at right angles to the direction of travel of the paper. As shown in Figs. 10 and 11 one recording pen 41 records superelevation, another pen 42 records the cross level of the rails 33' and 33'', a third pen 43 records the gauge, a fourth 44' the radii of curvature and irregularities in alignment of one, for instance the right-hand, rail 33', another pen 44'' records the radii of curvature and irregularities in alignment of the other, for instance left-hand, rail 33'', a further pen 45' records dynamic variations in level of the one, for instance right-hand, rail 33', and yet another pen 45'' the dynamic variations in level of the other, for instance left-hand, rail 33'', whereas a recording pen 45''' is allocated to recording the difference between the dynamic variations in cross level of the two rails 33' and 33''.

As is customary, the mileage, the time, as well as the more important artificial features in the lay-out of the permanent way are recorded by marks made by recording pens 46' and 46'' and 47, 48 respectively. Recording pens 49' and 49'' trace curves which represent the springing of the measuring carriage. However, this is not within the scope of the present invention so that the relative details as well as the recording elements 46', 46'', 47, 48 are hereinafter neither described nor further illustrated.

The recording element 43 (Figs. 10 to 12) is attached to an actuating rod 50 mounted in slots cut into supporting wheels 51, 52 which are arranged in pairs. The supporting wheel 51 also serves as guide means for the relative transmission cable which turns the wheel and thereby axially displaces the actuating rod 50 which in turn deflects the recording pen 43. The end of the transmission cable which runs over the supporting wheel 51 is yieldably secured to the vehicle body 30 by means of a spring 53, the remote end being attached to the relative measuring element in the measuring carriage 35. The other recording elements 42, 44', 44'', 45', 45'', 45''' are similarly constructed. The relative transmission cables from the supporting wheel 51 and the other wheels are taken through an opening 54 in the floor 55 of the vehicle body to a pulley box 56 on the measuring carriage 35. From the pulley box 56 the various cables are distributed to the different measuring elements in the measuring carriage 35 as will be hereinafter described in greater detail. The Bowden cable sheaths for guiding the cables extend between the pulley box 56 and the floor 55 of the vehicle body.

Figure 12:
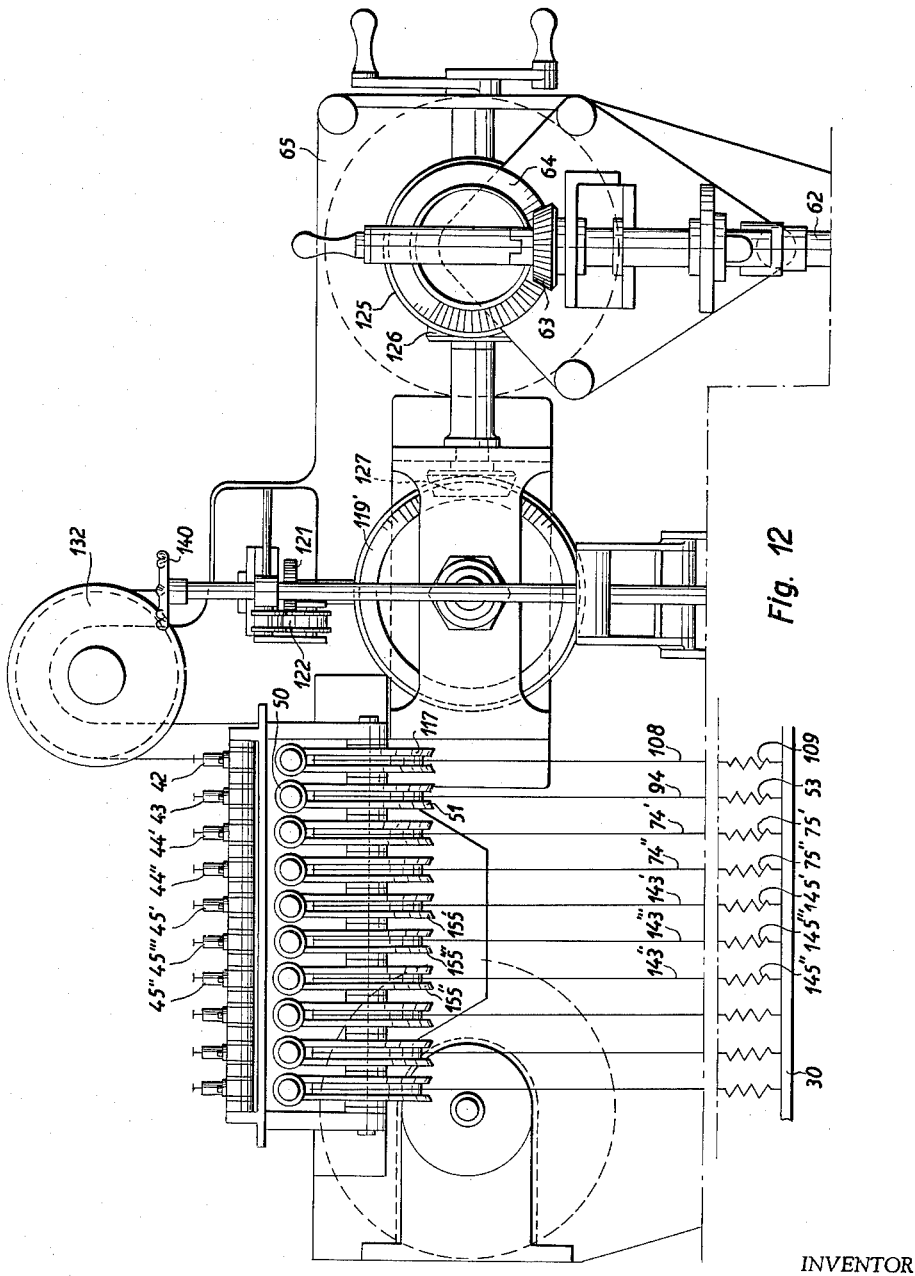
Figure 13:
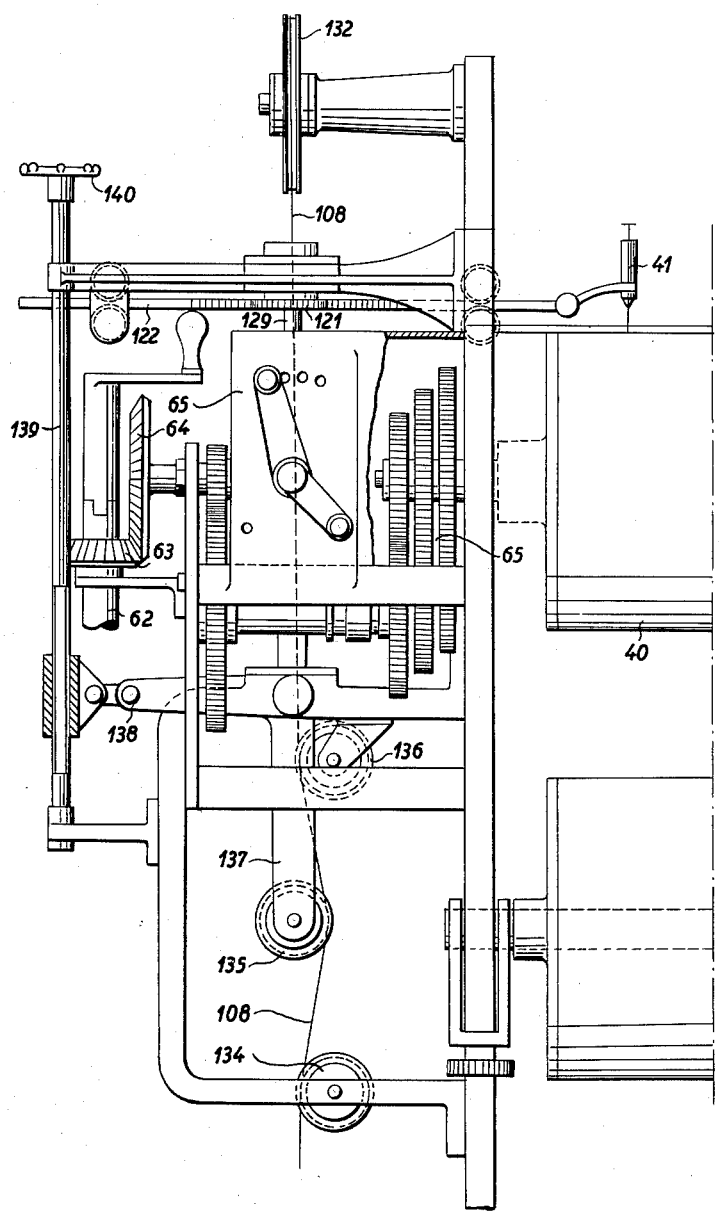

The paper drum 40 derives its movement from the wheels 37 of the measuring carriage 35, as is shown more particularly in Figs. 4, 4a, 5, and 7. For this purpose the wheel axle 37' carries a gear wheel 57 which engages a gear wheel 58 mounted in the measuring carriage. The rotation of gear wheel 58 is transmitted through a bevel wheel drive 59, 60 to a telescopic vertical Cardan shaft 61 connecting with a drive shaft 62 which extends through the floor 55 of the vehicle body. Figs. 12 and 13 show how the rotary motion of the shaft system 61, 62 is transmitted to the paper drum 40 of the recording set 39 through a bevel wheel drive 63, 64 and a speed-change gearing 65. To compensate the effect due to wear of the wheels 37 and 38 on the motion of the paper drum 40 which is proportional to the distance travelled, a compensating gearing such as a belt and pulley transmission with variable pulley diameter can be incorporated in the transmission system 57 to 65. However, such a compensating gearing forms no part of the present invention and need not therefore be described in greater detail.

The measuring carriage according to the invention will be hereinafter more particularly described with reference to the measurement of different track data and its operation in connection therewith.

(A) MEASUREMENT OF CHARACTERISTIC DATA IN THE HORIZONTAL PLANE OF THE TRACK

These characteristic data comprise the radius of curvature and irregularities in alignment of each rail separately, and the gauge of the track. In the form of construction illustrated by the drawings these factors are measured by sensing the rails by means of elastically loaded slipper elements suspended from the measuring carriage 35.

($a_1$) *Measurement of the radii of curvature and of irregularities in alignment*

Figure 4:
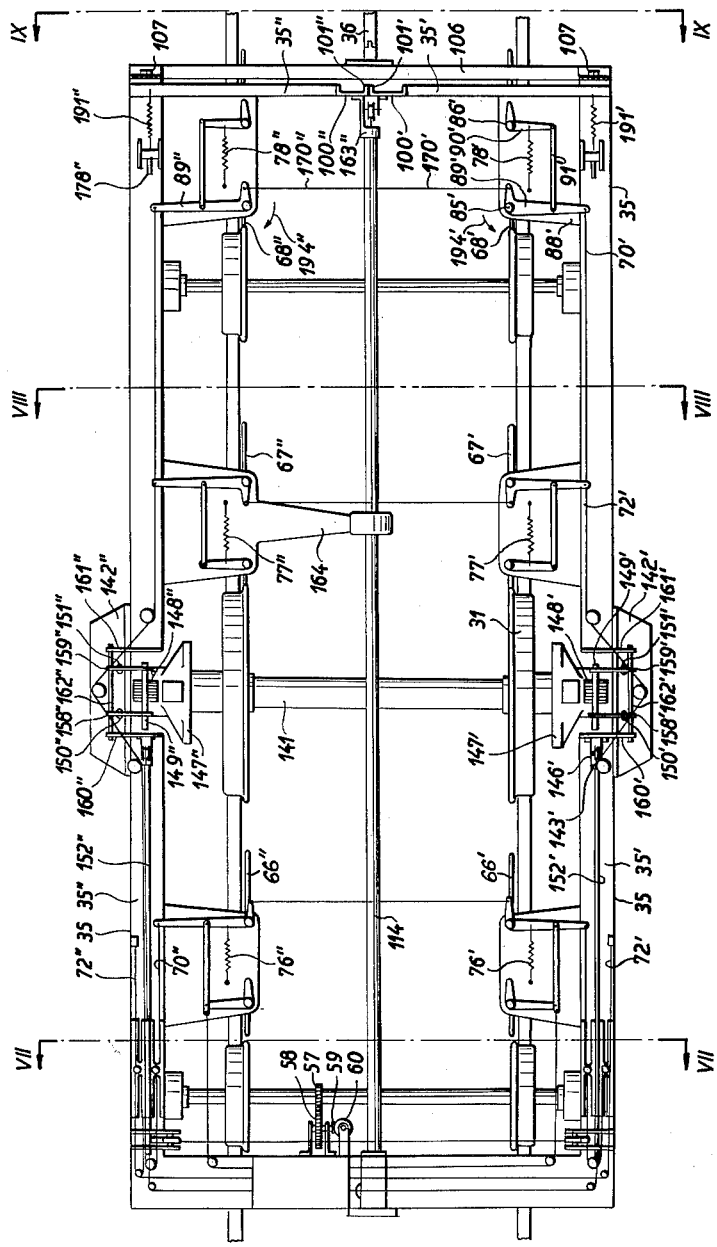
Fig. 4 is a top view of the measuring underframe, a portion of which is shown in Fig. 4a on an enlarged scale.

For this purpose, as shown in Fig. 4, a set of equidistantly disposed slipper elements 66', 67', 68' and 66'', 67'', 68'' is arranged on either side of the measuring carriage 35. The slipper elements are so designed that when running over points or cross-overs they will not leave the rails or be deflected to the wrong rail when they pass over the intersections in the running surface of the track. The slippers have tapered ends which guide them safely into the crossings. They are guided by a parallel linkage and therefore their position of contact with the rail remains the same. This is important because the radii of curvature and irregularities in alignment are determined by measuring the chord between the points of contact of the slipper elements and the rail. If the rails are deflected out of the straight the middle slipper elements move out of alignment with the outer slipper elements and therefore determine the versed sine above the chord between the two outer slipper elements which characterises the curvature of the rail, and this value is transmitted to the recording set 39 (see Fig. 1a).

It will be readily understood that the relative movements of the slipper elements due to any yawing movement of the measuring frame 35 must not be transmitted to the recording set. According to the invention this effect is eliminated by the special construction of the cable transmission, and this will be explained in greater detail with reference to Fig. 14. The following description refers to any particular set of three slipper elements 66, 67, 68 exploring any section of track 33 and transmitting information to any type of recording instrument 44.

Figure 14:
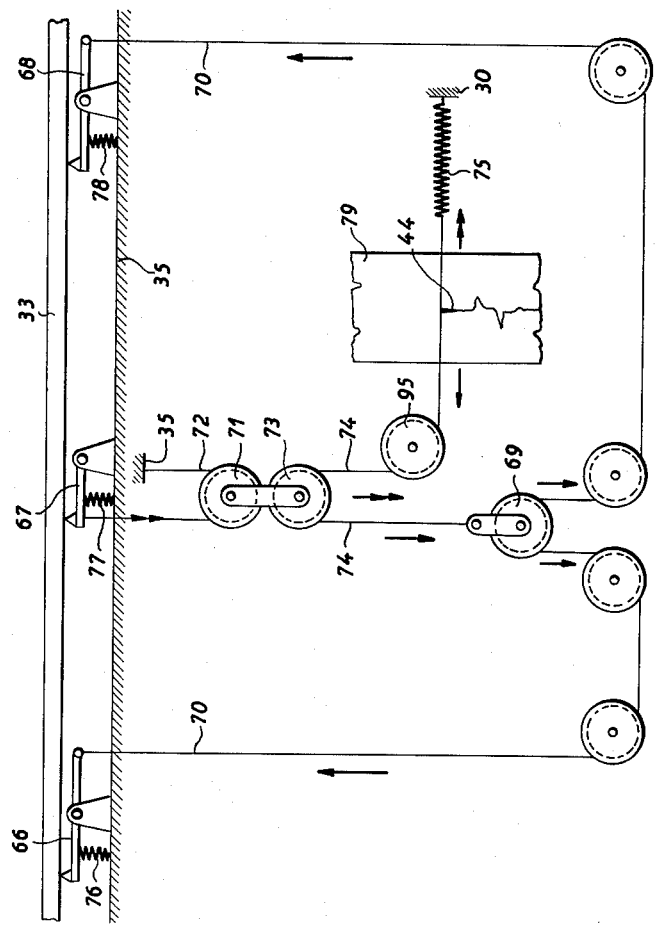
Figs. 14 to 19 are diagrams showing the principle of the transmissions employed.

It will be seen in Fig. 14 that the two outer slipper elements 66 and 68 are interconnected by means of a cable 70 which is taken over a first movable pulley 69, whereas the central slipper element is connected with the measuring carriage by means of a cable 72 which runs over a second movable pulley 71, but this latter cable is attached to the central slipper element in such a way that deflections in the same direction of the outer and middle slipper elements will pull the cables 70 and 72 in opposite directions. To transmit the relative movements of pulleys 69 and 71 to the particular recording pen 44 in the recording set 39 that is associated with these slipper elements, a third cable 74 is attached to the shaft of the first movable pulley 69, taken over a third movable pulley 73, mounted in a common frame with the second movable pulley 71, and then passed through the recording set 39 to a spring 75 attached to the body of the vehicle 30. 95 is merely a deflecting pulley to guide the cable 74 into the required direction.

The described counter-connection of the middle and the outer slipper elements is established by loading the slipper elements by springs 76, 77, 78 and attaching the cables to the slippers in such a way that, for instance, pull on cable 70 produces a clockwise deflection of the outer slipper whereas a pull on cable 72 produces a counterclockwise deflection of the middle slipper. The springs 76 to 78 are all more powerful than spring 75 so that the slippers will always be urged into contact with the inside edge of the rail 33 and the cables 70, 72, 74 will always be held tautly stretched.

It can be readily shown that in a transmission system consisting of cables 70, 72, 74 and of movable pulleys 69, 71, 73 any movement of the measuring carriage 35 in the transverse plane of the track 34 will produce deflections of the slipper elements 76 and 78 that will be exactly compensated through the cable transmission by the correspondind deflection of the middle slipper element. Running movements of the measuring carriage 35 within the transverse plane of the track 34 will not therefore entail corresponding movements of the recording pen 44. On the other hand, whenever the measuring carriage travels over an irregularity in rail alignment or through a curve the middle slipper element 67 will be deflected out of alignment with the two outer slippers 66 and 68, and this deflection will then be transmitted by the system 69 to 74 to the relative recording pen 44 in the recording set 39. This deflection is at the same time equal to the versed sine over the chord, which characterises the traversed curve and which is for practical purposes inversely proportional to the radius of curvature.

A practical embodiment of the principle underlying the transmission system as above described is shown more particularly in Figs. 4 to 9, where corresponding reference numerals are provided with a single or double-quote index mark. In principle this system is applied to all the slipper elements. However, for the sake of simplicity the following description relates to slipper element 68' only, but the description would similarly apply to all the other slippers, and the elements relating to slipper 68" are likewise provided with the double-quote index mark. The centre of that lateral surface of slipper 68' which faces the rail 33' is provided with a hard metal insertion 80'. This insertion forms the tracking spot. On either side of the hard metal insertion 80' the slipper 68' carries a pivot pin 81' and 82' respectively upon each of which is fulcrumed a horizontal lever arm 83' and 84' respectively. The ends of these horizontal lever arms again each carry an upright pivot pin 85' and 86' respectively, rotatably held in two overhanging cross plates 87' and 88' disposed the one above the other on the measuring carriage 35. The upper ends of the pivot pins 85' and 86' each carry a horizontal lever arm 89' and 90' respectively, lever arm 89' to which the transmission cable 70' is attached being appreciably longer than the horizontal arm 83' so that the deflections of slipper 68' will be magnified. The lever arms 89' and 90' are linked together by a link rod 91' so that the slipper 68' can only move in parallel motion.

($a_2$) *Measurement of track gauge*

In the illustrated form of construction the gauge is measured by corresponding slipper elements 66' and 66" on either side of the carriage, their relative motion in the level of the track 34 being transmitted to the recording pen 43 which records variations in gauge on the recording set 39.

Figure 15:
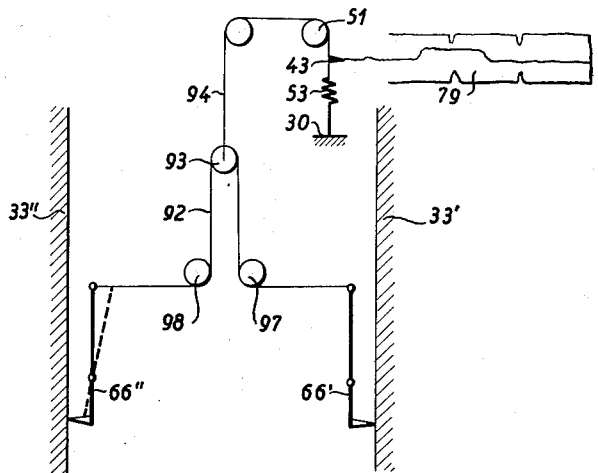

The principle upon which this measurement is based is shown in Fig. 15. The slipper elements 66' and 66" are yieldably interconnected by means of a fourth transmission cable 92 which is taken over a fourth movable pulley 93. A fifth cable 94 is attached at one end to the fourth movable pulley 93 and at the other end it is yieldably secured to the body of the vehicle through the recording set 39 or over the supporting wheel 51. The yieldable connection is established by a spring 53.

Figure 4A:
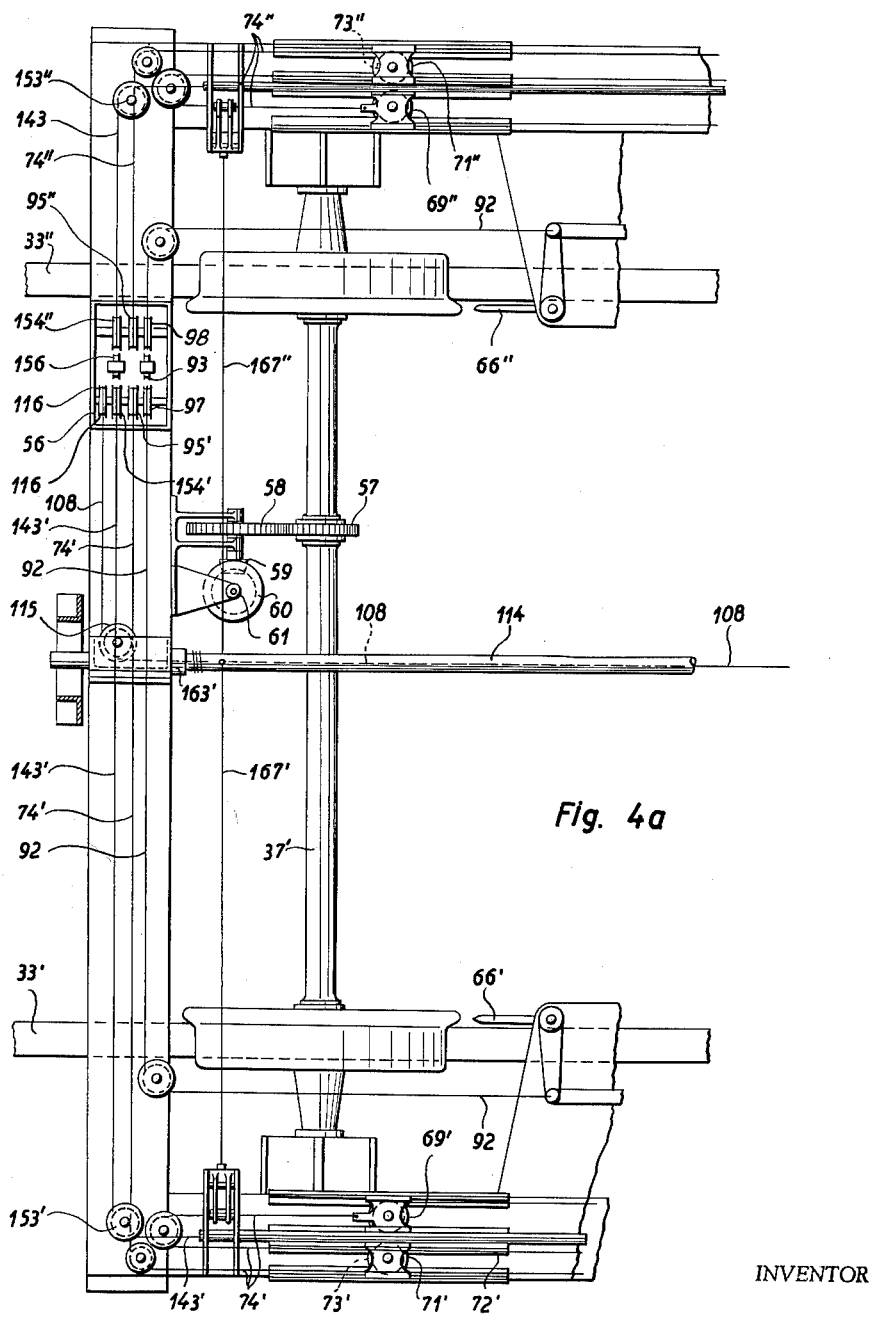

A practical embodiment is shown more particularly in Figs. 4 and 4a. The relevant deflecting pulleys in the pulley box 56 are indicated by reference numerals 97 and 98 respectively.

The pair of slipper elements 66' and 66" therefore serves both for the measurement of the radius of curvature and of irregularities in alignment of each of the two rails 33' and 33" as well as of variations in the gauge. Since the deflections due to variations in gauge are usually fairly wide a magnification of the slipper movements for transmission to the recording pen 43 is not required. The relative cable 92 is therefore attached to a shorter arm than those to which the transmission cables 70 and 72 are secured.

(B) MEASUREMENT OF THE RELATIVE LEVEL OF THE RAILS

The relative level of the individual rails characterises static variations in the cross level and in the track recording vehicle according to the invention the measurement of super-elevation is based upon the same data.

($b_1$) *Measurement of static variations in the cross level of the rails*

Figure 9:
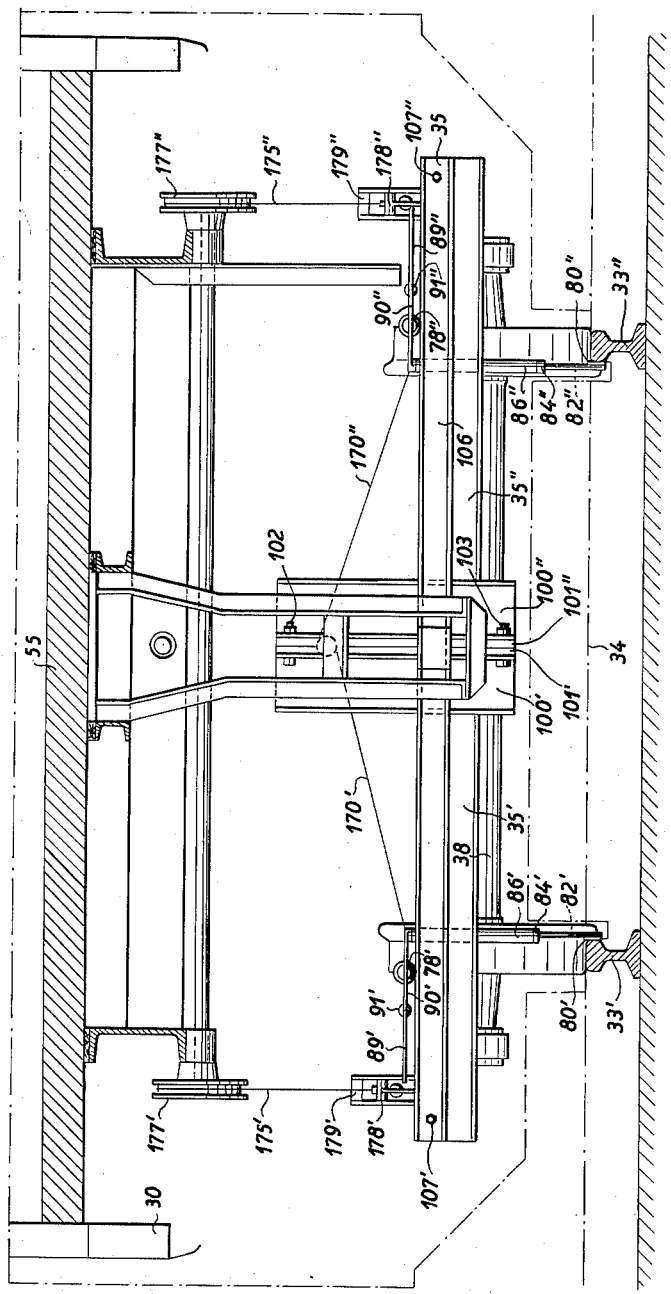
Fig. 9 is a section taken on the line IX—IX in Fig. 4.
Figure 16:
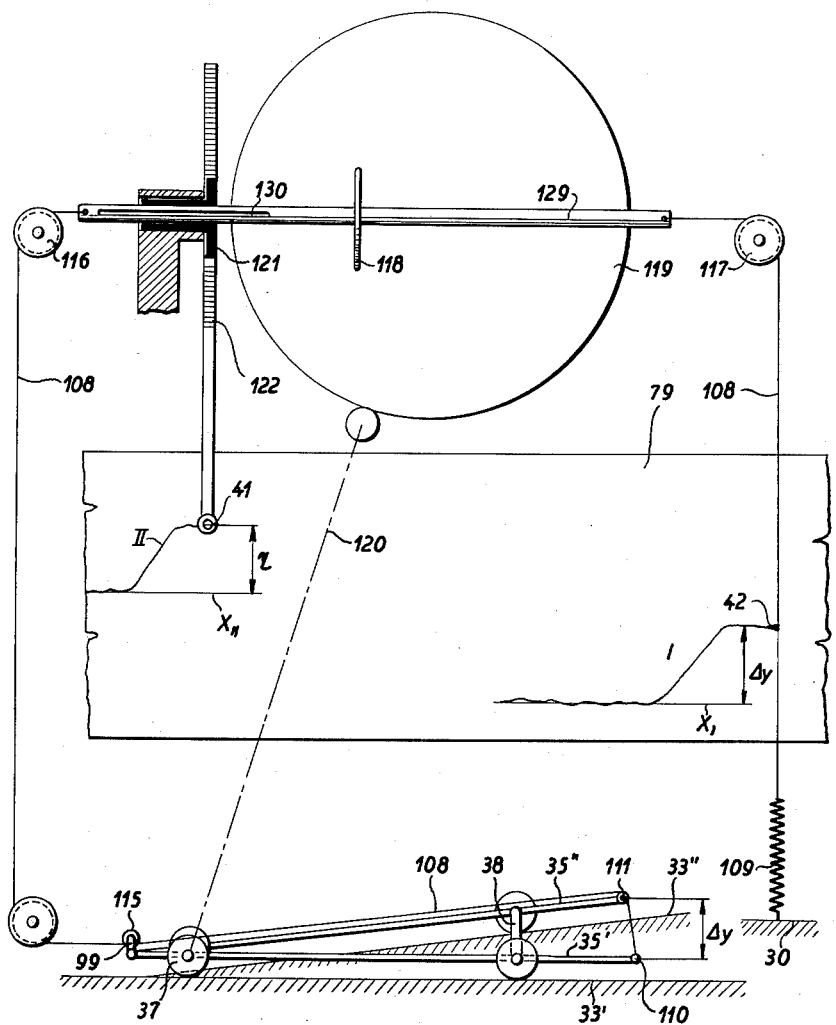

To measure this quantity by a determination of the relative level of the rails 33' and 33" the measuring carriage in the illustrated example is divided into two component sections 35' and 35", means actuated by the said carriage sections 35' and 35" being provided for the transmission of the relative swinging movements of the two component sections to the recording set (Figs. 5, 9 and 16). It is a matter of importance that the measuring carriage should be mounted unsprung on its two pairs of wheels 37 and 38 to ensure that the component sections 35' and 35" always occupy a position parallel to the length of rails 33' and 33" that happens to be traversed by the respective sections 35' and 35" of the carriage. These will then instantaneously adapt their position to the varying level of the two rails, unlike gyroscopic systems which exhibit a certain amount of inertia and are therefore unable to follow minor static irregularities in rail level.

As shown more particularly in Figs. 4 to 6 and 9, the swivel axis of the two carriage sections is embodied in a tubular member 99 located at one end of the carriage 35. At the other end of the two carriage sections 35' and 35" each section carries, parallel with the vertical plane of symmetry of the carriage, a column 100' and 100" respectively consisting of channel section irons. The opposed faces of these columns are provided with sliding elements 101' and 101" and contact between the rubbing faces of the sliding elements 101' and 101" is secured by bolts 102 and 103 which permit relative displacement by working in slots 104 and 105. The relative transverse position of the two carriage sections 35' and 35" is determined by a cross member 106 which relieves the bolts 102 and 103 of horizontal transverse loads without in any way impeding the vertical swinging motion of the carriage sections 35' and 35''. To this end the cross member 106 is attached to the measuring carriage 35 by means of bolts 107' and 107'' which have sufficient play to allow relative angular swivel between the measuring carriage 35 and the cross member 106 and freedom of angular displacement between the two sections 35' and 35''. When the two rails lie exactly in the required track level 34 the two sections 35' and 35'' of the carriage will likewise be in exact alignment, i.e. they will lie in a plane parallel to the track level 34. However, if the vertical position of the two rails 33' and 33'' is not in the same horizontal level, that is to say, if the cross level of the track 34 is statically twisted the carriage sections 35' or 35'' will likewise be relatively vertically displaced and their positions will be determined by skew lines which characterise the irregularity in the cross level 34 of the track.

A sixth cable transmission 108 is provided to transmit this difference in the vertical levels of the two rails 33' and 33'' to the relative recording pen 42. The principle of transmission is illustrated in Fig. 16. The said cable is fastened to the free end of one carriage section 35' and is taken around the swivel axis 99 of the carriage 35 to the recording set 39 and thence to the body 30 of the vehicle to which it is yieldably attached through a spring 109.

In a practical embodiment of this principle the column 100' carries a pulley 110 and column 100'' a second pulley 111. The cable 108 is secured at 112 to the shackle 113 of pulley 111 and runs from there over pulley 110 and then over pulley 111. Relative vertical displacement between the two carriage sections 35' and 35'' will therefore cause the section of cable between the pulleys 110 and 111 to lengthen or shorten by an amount $\Delta y$ which characterises the relative vertical level of the two rails 33' and 33''. The cable is taken through a tube 114, suspended in parallel with the longitudinal axis of the measuring carriage 35, to the swivel axis 99 whence it is taken over a pulley 115 to the pulley box 56. Running over a pulley 116 in the pulley box 56 the cable 108 then extends upwards on to the supporting wheel 117 on the recording set 39.

Figure 17:
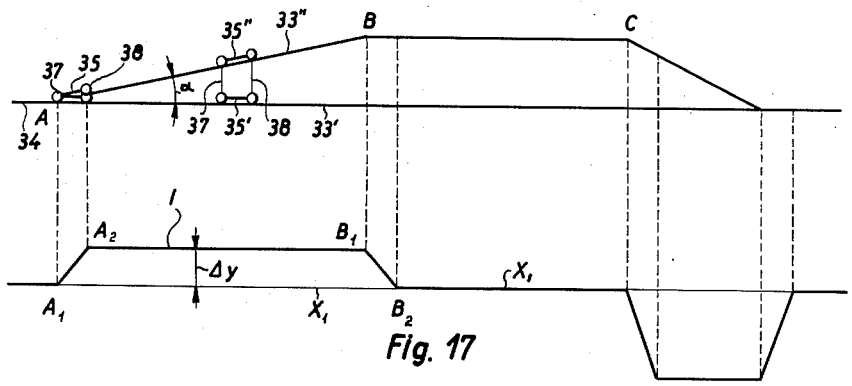

The method of measuring the relative vertical level of the rails 33' and 33'' will now be further explained with reference to Fig. 17, the upper part of which represents the horizontal projection of a length of track with skew rails 33' and 33'', whereas the lower part of the drawing shows the curve I recorded by the recording element 48.

When the pair of wheels 38 of the measuring carriage 35 reaches point A where the track level 34 begins to cant for instance as a result of one rail gradually rising to a superelevated rail section, a relative vertical swivelling displacement of the carriage sections 35' and 35'' about their swivel axis 99 will gradually ensue. This swivelling movement continues until the trailing pair of wheels 37 of the measuring carriage 35 likewise reaches point A. Owing to the relative displacement $\Delta y$ between the sliding members 101' and 101'' the recording pen 42 will trace the sloping section $A_1$—$A_2$ of curve I. As long as the measuring carriage ascends the ramp the sliding members 101', 101'' will remain relatively displaced by the said amount $\Delta y$, until the leading pair of wheels 38 of the measuring carriage 35 reaches point B on rail 33'', that is to say, the end of the ramp and the point of maximum superelevation. During this period the recording pen 42 will have plotted a straight line $A_2$—$B_1$ parallel with the base line $x_1$. The relative displacement between the two sliding members 101' and 101'' will now lessen until the trailing pair of wheels 37 has likewise reached the superelevated section B—C where the cross level of the track 34 is canted but where the rails are no longer skew, both rails 33' and 33'' and consequently the carriage sections 35' and 35'' resuming their parallel position. The displacement $\Delta y$ is again reduced to zero, the recording pen 43 tracing the sloping section $B_1$—$B_2$ of the curve which returns to its base line $x_1$. The wheels 38 then continue to run along the superelevated section B—C of the rail 33''.

As the measuring carriage descends the falling ramp which begins at C and leads back to a horizontal cross level of the track the above described events will occur in reversed sequence.

It will be clear that the ordinates of curve I are proportional to the slope of the ramp, because for practical purposes $$\Delta y = L \cdot \tan \alpha \qquad (1)$$

where $\alpha$ is the angle of slope of the ramp and L is the distance between the swivel axis 99 and the point of attachment of the cable 108 to the measuring carriage 35, i.e. pulley 111. The angles of slope of the ramp can therefore be easily determined simply by reading the length of the ordinates of curve I. Since this angle is also characteristic of the variation in cross level 34 the above described recording can be used as a basis for the determination of static variations in cross level 34.

($b_2$) *Measuring superelevation*

Figure 18:
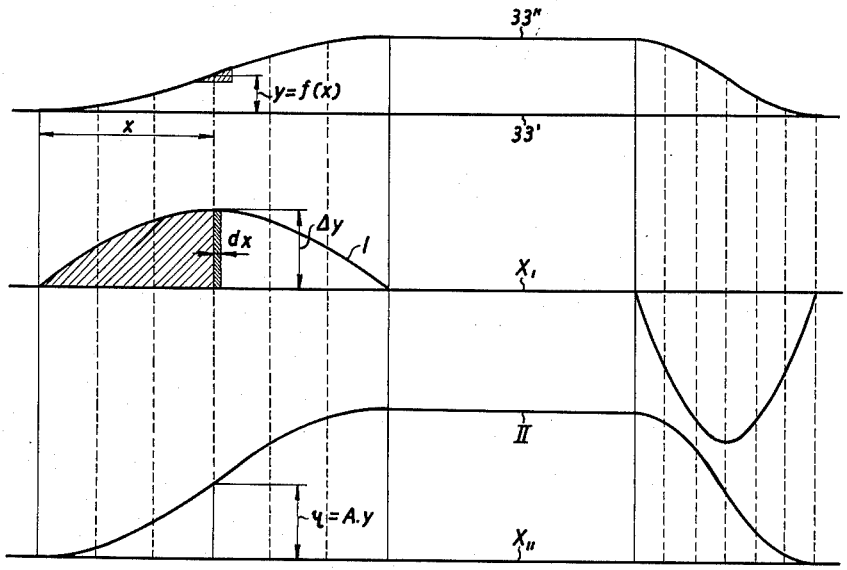

It has already been mentioned that the measuring carriage according to the present invention permits a determination of superelevation without requiring a gyroscopic horizon, inasmuch as the superelevation may be obtained by integration of the differential curve which represents the relative vertical levels of the two rails, as shown in Fig. 18.

Let is be assumed that the line of superelevation comprising the superelevated section B—C and the adjoining ramp sections is determined by an equation $$y = f(x) \qquad (2)$$

$y$ being the superelevation at the point $x$. It follows from Equation 1 that $$\tan \alpha = \frac{\Delta y}{L} \qquad (3)$$

Since the slope of ramps in practice is between 1:500 and 1:1000, i.e. very small, the difference quotient $\Delta y/L$ may be replaced by the differential quotient $dy/dx$, and hence we may write $$\tan \alpha = \frac{dy}{dx} \qquad (4)$$

$dy/dx$ representing the differential curve of Equation 2. On the other hand, it follows from Equations 3 and 4. that:

$$\Delta y = L \cdot \frac{dy}{dx} \qquad (5)$$

Now the value of $\Delta y$ is continuously plotted by the recording element 42, as has been described with reference to Fig. 17. Curve I is therefore proportional to the required differential curve, the factor of proportionality being $1/L$.

$$\frac{dy}{dx} = \frac{\Delta y}{L} \qquad (6)$$

The superelevation at a point $x$ is therefore $$y = \int_0^x \frac{\Delta y}{L} dx \qquad (7)$$

To find the line of superelevation II it is therefore merely necessary continuously to integrate the differential curve I and to chart the result as a function of the distance $x$ travelled by the measuring carriage 35. The ordinates $\eta$ of curve II are then proportional to the ordinates $y$ of superelevation, i.e.

$$\eta = A \cdot y \qquad (8)$$

the factor A being the instrument coefficient which can be determined in the conventional manner and used in the evaluation of the integral curve.

The integral curve II is plotted by a recording pen 41 which is actuated in dependence upon the distance travelled by the measuring carriage 35 and the movement of the recording pen 42 which plots the differential curve I. The principle of operation of an integrating device that may be used in this connection is illustrated in Fig. 16, and a practical embodiment thereof is shown in Figs. 12, 12a, 13 and 13a respectively. The integrating instrument 10 is driven in dependence upon the distance travelled by the measuring carriage 35 and controlled by the relative angular position of the component sections 35' and 35" of the measuring carriage 35. The resultant movements of the integrating machine are used to control the movements of that recording pen 41 in the recording set 39 which is intended to record superelevation. The cable 108 controls the axial position of an integrating wheel 118 which is in frictional engagement with a driving disc 119. The revolutions of the driving disc 119 are proportional to the distance travelled by the measuring carriage 35, as indicated by the dot-dash line 120. In the zero position the integrating wheel 118 rests on the centre of the driving disc 119, and the recording pen 41 will then trace the zero line $x$. As soon as the measuring carriage 35 runs on to a ramp, the two carriage sections 35' and 35" will be relatively angularly displaced, the cable 108 will be pulled and deflect the recording pen 42 which plots the curve representing the angle $\alpha$ enclosed by the two carriage sections 35' and 35". The differential curve I will thus be traced on the paper. At the same time the integrating wheel 118 will be moved out of its centre position and begin to revolve under the action of the driving disc 119. This results in the displacement of a rack 122 through a pinion 121, and the end of the rack carries the recording pen 41. The integrating wheel 118 continues to revolve until the carriage sections 35' and 35" realign and the recording pen 42 has returned to the base line $x_1$ of the differential curve I. The integrating wheel 118 concurrently returns to its normal position on the centre of the driving disc 119. The position of the rack 122 will then have deflected the recording pen 41 through a distance $\eta$ which is proportional to the amount of superelevation $y$.

The recording pen 41 will therefore continue to trace a straight line parallel with the base line $x_{11}$. When the measuring carriage descends the ramp which leads the superelevated rail back into horizontal cross alignment with the other rail the integrating wheel 118 will be moved into the opposite direction to that in which it had been previously moved and consequently it will now revolve in the opposite direction to that of its previous revolution. Hence the rack 122 and the recording pen 41 will move back towards the original base line $X_{11}$ of the integral curve II.

In practice the integrating machine (Fig. 13a) comprises two driving discs 119' and 119" revolving in opposite directions about a common axial centre line 123, in accordance with the distance travelled by the measuring carriage 35, and frictionally engaging the integrating wheel 118 which stands edgewise between them, and which is axially shiftable as indicated by the dot-dash line 124 so that it can participate in the movement of the cable 108 which transmits the relative vertical angular displacement between the two carriage components 35' and 35". The revolutions of the integrating wheel 118 determine the deflection of the recording pen 41 which plots the integral curve II.

The driving discs 119' and 119" derive their rotary motion, as shown in Fig. 12, from the shaft 62 via a bevel wheel drive 63, 64, a second bevel wheel drive 125, 126, and a mitre wheel 127. As shown in Fig. 12a, the cable 108 is attached to a sliding member 128 which can move longitudinally inside a guide tube 129 provided with a guide slot 130. The integrating wheel 118 itself is longitudinally slidable on the guide tube 129. The relative angular position of the sliding member 128 in the guide tube 129 is maintained by a guide pin 131 which engages the slot 130 and is attached to the sliding member 128. The cable 108 runs over a guide pulley 132 back to a supporting wheel 117 for the recording pen 41, similar to the other supporting wheels, and it is then attached through a spring 109 to the body 30 of the vehicle.

If the integrating wheel 118 should not be properly centralised with respect to the driving disc 119 when the recording vehicle traverses a straight uncanted part of the line, adjustment can be made by tautening or releasing the cable by means of a lever mechanism. To this end three tension pulleys 134 to 136, as shown in Fig. 13, are provided, the central pulley 135 being mounted on one arm 137 of a two-armed lever 137, 138. The other arm 138 engages the threads of an adjusting spindle 139 which can be rotated by a handwheel 140 for tilting the lever 137, 138. Consequently the tension pulley 135 is forced more or less against the cable 108 and thus adjusts the axial position of the integrating wheel 118.

(c) MEASUREMENT OF DYNAMIC VARIATIONS IN LEVEL

Dynamic variation in level are understood to refer to the elastic depressions or elevations in each rail and their differences between the two rails. To measure these data according to the invention the measuring carriage 35 cooperates with one pair of running wheels 141 (Fig. 8) of the recording vehicle. Such a set of wheels may be specially provided for the purpose or, alternatively, one of the existing pairs of wheels 31 of the running gear may be used, as is illustrated in the embodiment shown in the drawings. Means are provided for ascertaining the relative vertical movements between the measuring carriage 35 and the pair of running wheels 141, and for transmitting these movements to the recording set 39.

Figure 19:
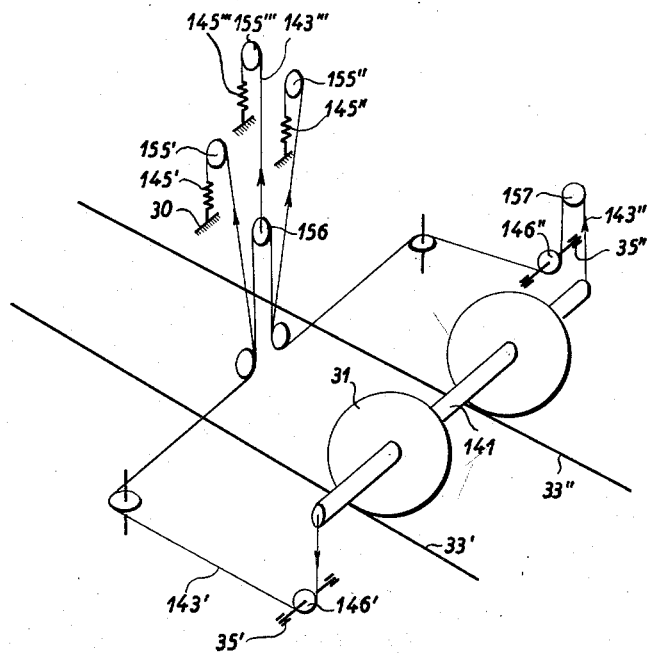

As shown in Fig. 4, for convenient cooperation with the pair of running wheels 141 the measuring carriage 35 has lateral bay sections 142' and 142" in the middle on either side. The principle upon which the measurement of the relative movements is based is illustrated in Fig. 19.

($c_1$) *Measurement of variations in level of each rail separately*

To transmit the relative vertical movements between the measuring carriage 35 and the pair of running wheels 141 provision is made for a seventh and an eighth transmission cable 143' and 143" respectively, one for each rail 33' and 33", and these are attached, on the one hand, to a linkage between the measuring carriage 35 and the wheels 141 and, on the other hand, through the recording set 39, elastically to the vehicle body 30. The said cables therefore actuate the recording pens 45' and 45" (Figs. 10 to 12) which record the dynamic irregularities in the level of each rail. Elastic connection to the vehicle body 30 is established by spring 145' and 145" respectively. The cables 143' and 143" are taken from the ends of the wheel axle 141 over guide pulleys 146' and 146" mounted in the measuring carriage 35. Consequently the relative vertical movements between the ends of the wheel axle 141 and the guide pulleys 146' and 146" will induce corresponding movements in the two cables 143', 143", and these are used to deflect the recording pens 45' and 45". In other words, the measuring carriage is the reference system for the vertical movements of the pair of running wheels 141.

Details of the linkage above referred to are shown in Figs. 4, 4a, 5 and 8. In the illustrated form of construction the axle box 147' of the pair of running wheels 141 is provided with a cylindrical bearing surface 148' which is concentric therewith, a finger member 149' embodied in a horizontal cylindrical member perpendicular to the centre line of the bearing surface being urged into contact with the latter, with a cable 143' attached vertically to its associated finger member 149'. Springs 150' and 151' (Fig. 5) maintain contact between the finger member 149' and the bearing surface 148'. The finger member 149' is attached through lever arms 158' and 159' to a swivel pin 162' working in lateral plate extensions 160' and 161' on the frame of the measuring carriage 35.

The cable 143' is conducted through a tube 152' to that end of the measuring carriage 35 which in Fig. 4 appears on the left, whence it runs over a deflecting pulley 153' into the pulley box 56. A pulley 154' then deflects the cable 143' upwards to the supporting wheel 155' of the recording set 39. The other end of the wheel axle 141 is equipped in a similar manner, corresponding parts being indicated by the double-quote index marks of the relative reference numerals.

Further to clarify the advantage of the method thus offered of recording dynamic irregularities in the track level, that is to say the depressions and elevations of each rail, it is assumed that the net weight of the measuring carriage is about 1400 kg. whereas the weight transmitted by the two wheels of the axle 141 of the track recording vehicle to the track is 13,000 kg. Hence the weight transmitted to the track by each pair of wheels of the measuring carriage 35 is only 700 kg., i.e. about one twentieth of the load transmitted by the pair of wheels 141. Consequently the elastic components of the rail depressions will be recorded free from interference by secondary deflections. The variations in level that are not dynamic appear merely in the form of minute deflections which are quite negligible by comparison with the magnitude of the deflections due to dynamic irregularities.

($c_2$) *Measurement of dynamic irregularities in cross level*

It may be important to record these values since the roll of railway vehicles is largely determined by them. For the purpose of measuring these irregularities the cables 143' and 143" (Fig. 19) respectively which transmit the dynamic variations in level of the individual rails are attached at a relative angle of 180° to the linkage mechanisms and are interconnected through the intermediary of a fifth movable pulley 156 in the measuring carriage 35, the said movable pulley 156 being yieldably connected by a ninth transmission cable 143'" via a supporting wheel 155'" on the recording set 39 to the vehicle body 30, this cable 143'" which is attached to the movable pulley 156 transmitting the difference between the two dynamic variations in level to the relative recording pen 45'". The yielding connection between the cable 143'" and the vehicle body 30 is established by a spring 145'".

As will be seen by reference to Figs. 4, 4a, 5 and 8 the cable 143' runs over the guide pulley 146' and is attached to the finger member 149' from below. To enable the cable 143" to be attached at an angle of 180° in relation to cable 143' a deflecting pulley 157 is interposed between the finger member 149" and the guide pulley 146".

If owing to dynamic variations in the level of the rails 33' and 33" one of the axle boxes 147' and 147" (Fig. 4) respectively rises or falls in relation to the component members 35' and 35" of the carriage, the finger members 149' and 149" will be deflected about their fulcrums 161' and 161" respectively. These deflections are transmitted through the cables 143' and 143" to the recording pens 45' and 45" (Figs. 10 to 12) in the recording set 39, whereas the recording pen 45'" actuated by the transmission cable 143'" will record the differences between the dynamic variations in the level of the two rails.

As has been explained the cables are conducted from the measuring element over guide and deflecting pulleys into the pulley box 56 which is mounted on the measuring carriage and which contains the necessary set of deflecting pulleys to deflect the transmission cables into the interior of the vehicle body. The Bowden cable sheaths through which the cables are taken from the measuring carriage 35 to the vehicle body 30 are joined on the one hand to the pulley box 56 and, on the other hand, to the floor 55 of the vehicle body 30 and in Fig. 6 they are indicated by reference numerals 740', 740", 940, 1080, 1430', 1430" and 1430'" which are also indicative of the transmission cables they contain. For the sake of clarity in the drawing the actual sequence of the connections is not strictly adhered to because some of the Bowden cables would then have to be shown as crossing over.

It will be understood from what has been said that nine cable transmissions from the measuring carriage are sufficient for transmitting the measurements and recording the most important data relating to the state of the track, namely the gauge, superelevation, static variations in cross level, the radii of curvature and irregularities in alignment of each rail separately, the dynamic irregularities in the level of each rail separately and the differences between the dynamic levels of the two rails.

(D) SUSPENSION OF THE MEASURING CARRIAGE

It is expedient to allow the measuring carriage to run on the track only when it is desired to take recordings. The track recording vehicle is therefore equipped with hoisting gear for raising the measuring carriage off the rails when it is not in use. Arrangements are also required to withdraw the slipper elements from the rails. Moreover, it is advisable to support the raised measuring carriage to relieve the hoisting gear of the weight of the carriage. The manner in which this is done in the illustrated example will be explained hereunder in greater detail.

($d_4$) *Withdrawing the slippers from the rails when raising the measuring carriage*

To this end the measuring carriage 35 is equipped with a control member which is connected, on the one hand, with the hoisting gear for raising the measuring carriage and, on the other hand, with the slipper elements. This control member is adapted to have a two-stage action, one for withdrawing the slippers in the level of the track and at right angles to the longitudinal axis of the measuring carriage and the other for the vertical movement of the measuring carriage in relation to the level of the track.

Figure 7:
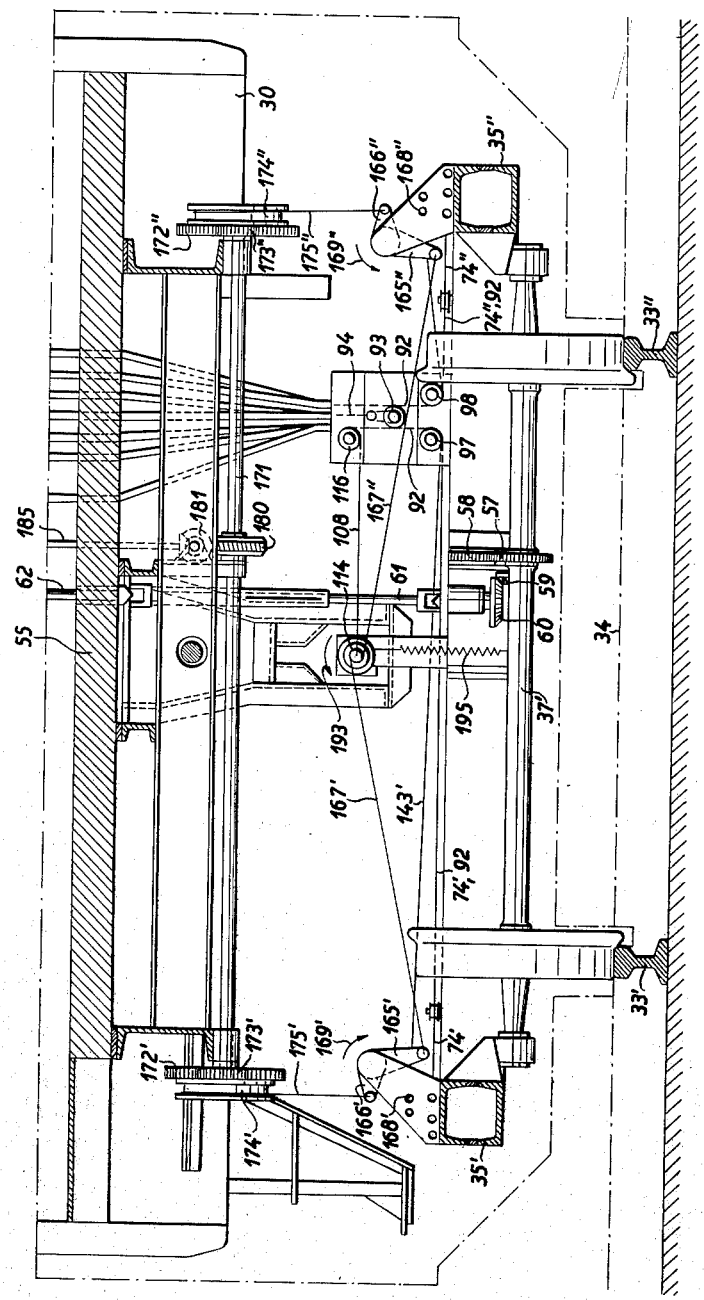
Fig. 7 is a section taken on the line VII—VII in Fig. 4.
Figure 8:
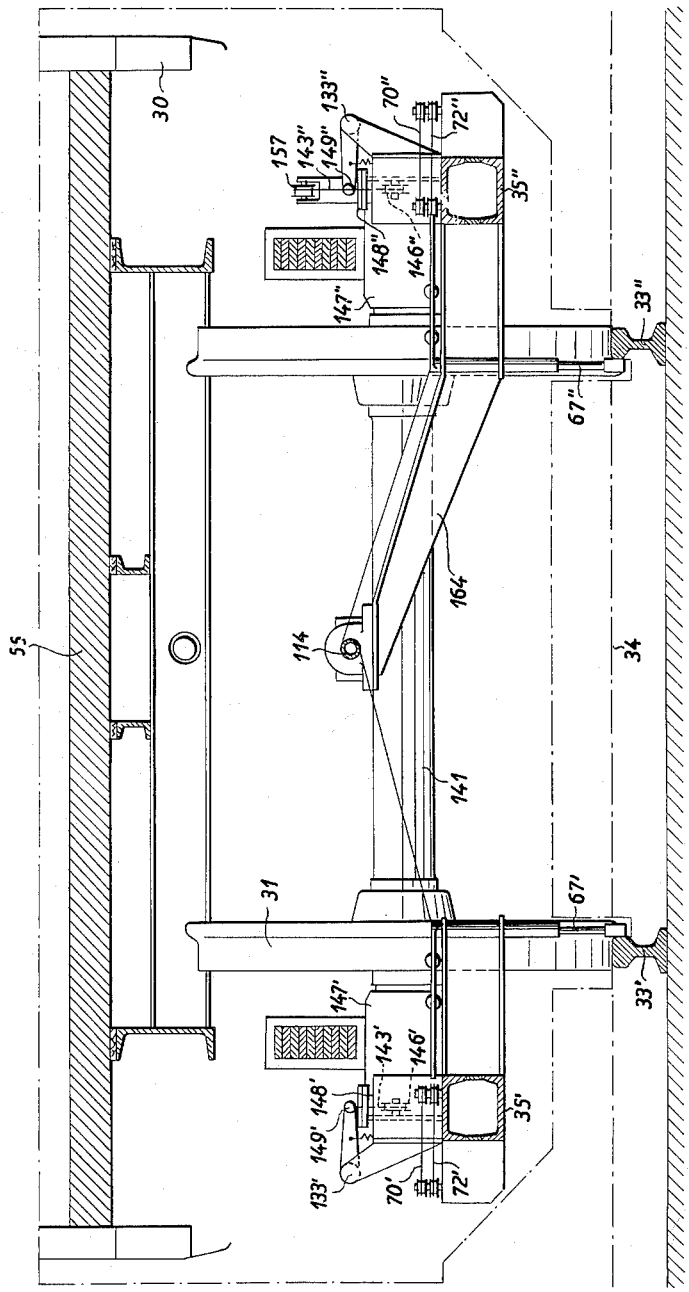
Fig. 8 is a section taken on the line VIII—VIII in Fig. 4.

In the illustrated embodiment in Figs. 1a, 7 and 9, the control member comprises a tube 114 disposed in the measuring carriage, or more particularly in the carriage section 35", and longitudinally of the same, which contains the cable 108, and which is rotatably mounted in the end members of the carriage section 35" at 163' and 163" as well as in a bracket 164 in the center, as shown in Figs. 5 to 9. The control member 114 is connected with the hoisting gear through double-armed levers 165', 166' and 165", 166" by means of cables 167' and 167". The cables are slung round the tube 114 in opposite directions, the limits of the consecutive stages of motion of the tubular control member 114 being determined by stops 168' and 168" respectively, as is shown more particularly in Fig. 7. The deflection of the double-armed levers when the measuring carriage is hoisted, as shown by the arrows 169' and 169" respectively, is limited by the said stops which transmit the lift to the measuring carriage as soon as the levers have come into contact with them.

To move the slipper elements in the level of the track, i.e. to withdraw them from contact with the rails 33' and 33" or, alternatively, to move them back into contact with the rails, the parallel linkage of the slipper members is connected with the control member or tube 114. To this end, for instance, the parallel linkage of slipper element 68' is connected with the tubular control member 114 by means of the double-armed lever 89'. The parallel linkage of slipper element 68" is connected with the tubular control member 114 in a similar manner as indicated by corresponding reference numerals with double-quote index marks. The remaining slipper elements are likewise connected through their parallel linkages with the tubular control member 114 in the manner that has been described so that further elaboration is unnecessary.

The hoisting gear as such consists of a horizontal rotatably mounted hoisting shaft 171 (Fig. 7) extending crosswise of the longitudinal axis of the recording vehicle on the vehicle body, the said shaft driving a cable drum 174' through gear wheels 172' and 173'. A cable 175' extends from the drum directly to one arm 166' of the double-armed lever 165', 166'. The cable 175' is deflected at 176' (Fig. 5) and runs over a guide pulley 177' to the other end of the measuring carriage to transmit the lift through a lever 178' and a stop 179' to the other end of the carriage as well. Since similar arrangements are made on the other side of the carriage 35, as indicated by double-primed index marks, the lift is applied to all four corners of the measuring carriage 35.

Approximately in the centre of the hoisting shaft 171 is a wormwheel 180 connected through a worm 181, a shaft 182, and a bevel wheel gearing 183, 184, with a vertical shaft 185 incorporated in the hoisting gear. The shaft 185 extends through the floor 55 of the vehicle body 30 to a conventional gearing which may be operated either by hand or by mechanical power, as indicated at 186 and 187 respectively in Fig. 1a. At 188 and 189 clutches are incorporated in shaft 185 by means of which the hoisting gear can be coupled for manual or power operation. The control circuits for power etc. are located in a cabinet 190.

To explain the manner of operation of the hoisting gear it is assumed that the measuring carriage 35 happens to be resting on the rails and that it is desired to raise it. Clutch 189 (Fig. 1a) is disengaged and clutch 188 brought into engagement, so that the gear will be driven by the electric motor. The electric motor 187 is started and causes shaft 185 to revolve in the appropriate direction for hoisting. The rotation of the shaft is transmitted through the various reduction gears to the cable drums 174' and 174" (Fig. 7) respectively which begin to wind up the cables 175' and 175". The double-armed levers 165', 166' and 165", 166" will then be deflected in the direction indicated by the arrows 169' and 169" respectively, whereas levers 178' and 178" are deflected in the direction of arrow 192 against the counter-tension of their springs 191' and 191". The arms 165' and 165" respectively of the double-armed levers 165', 166' and 165", 166", through the action of cables 167' and 167", then cause rotation of the tubular control member 114 in the direction of arrow 193, and cables 170' and 170" at the same time deflect the double-armed levers 89' and 89" in the direction of arrows 194' and 194" respectively so that the slipper members 68' and 68" will be withdrawn from the rails 33' and 33".

The other slipper elements are withdrawn from the rails in a similar manner.

These movements continue until the further deflection of the levers is prevented by the stops 168', 168" and 179', 179" respectively. This completes the first stage in the action of the tubular control member 114. As the hoisting shaft 185 continues to revolve lift is now transmitted to the measuring carriage 35 itself so that the latter will gradually lift off the rails and approach the floor 55 of the vehicle body 30. This process goes on until the electric motor 187 is stopped.

When the measuring carriage 35 is lowered the sequence in the operational stages of the tubular control member 114 is reversed, the measuring carriage 35 being first lowered until its wheels 37 and 38 touch the rails. As the tension relaxes the tubular control member 114 resumes its original position under the influence of the spring 195 and thereby allows the slipper elements to return into contact with the rails.

The raising and lowering of the measuring carriage may be automatically controlled. Suitable means are known to the art and require no further detailed description.

($d_2$) *Suspension of the raised measuring carriage*

In the form of construction herein described the raised measuring carriage 35 is suspended from double hangers anchored to the vehicle body 30 at either end of the carriage 35, one of which is indicated in Fig. 5 by the reference numerals 196, 197, and which are adapted to be brought into engagement with the measuring carriage 35 when the latter is in the raised position. Hooks are therefore provided on the frame of the measuring carriage 35 at appropriate points, as shown for instance at 198. Fig. 20 shows the hanger 196, 197 and the hook 198 in engagement. The two members 196 and 197 of the hanger are articulated and loaded by means of a spring 199 in such a manner that the members 196 and 197 are urged to assume a relatively angular position on their common pivot 200. For the sake of clarity the members 196, 197 of the hanger in Fig. 5 are shown in alignment despite the fact that the measuring carriage 35 is lowered on to the rails and hanger 196, 197 and hook 198 are not in mutual engagement. The member 197 has a pin 201 for holding the hook.

The other hangers and hooks not shown in the drawings are constructed in a similar way. The articulated construction of the hangers ensures that the latter are not in the way of the measuring carriage 35 when the latter has been detached from the hangers 196, 197.

When the measuring carriage 35 is raised the hook 198 reaches a position in which the pin 201 of the closed hanger 196, 197 can engage the hook against the load of its spring 199. The measuring carriage 35 is then slightly lowered to transfer its load through the hook 198 to the hanger 196, 197, and through the hanger to the body 30 of the vehicle, thereby relieving the hoisting gear of the weight.

To lower the measuring carriage 35 on to the rails it is first slightly raised to permit the pin 201 of the hanger 196, 197 to be detached from the hook 198. After having been thus detached the members of the hanger 196, 197 revert to their angular position under the pull of the spring 199 so that the neighbourhood of the measuring carriage 35 is free from obstructions. The other hangers work in the same way. The measuring carriage can then be lowered completely on to the rails.

The track recording vehicle according to the invention has been described with reference to an illustrative embodiment comprising two axles. From the description of the vehicle that has been hereinabove given it will be readily understood that bogie vehicles may likewise be used to serve as track recording vehicles according to the invention. However, in such a case a special pair of wheels for cooperation with the measuring carriage would have to be provided to measure the dynamic irregularities in rail level, as described under C. This pair of wheels would have to participate in supporting part of the weight of the vehicle, in other words, form an integral part of the running gear of the vehicle. The measuring carriage may also be designed without being divided into two independently deflectable component members by suspending it from its running wheels on springs and then measuring the value of the quantities in the vertical plane, which have been dealt with under B, by using gyroscopic equipment as a reference system. Even in such a case the measuring carriage according to the invention will offer the advantage of permitting an accurate and simple determination of the radii of curvature and of irregularities in rail alignment to be made.

I claim:

1. A track-recording vehicle for measuring and recording data which determine the state of the track including the relative level of the two rails, comprising a running gear and a vehicle body, recording equipment in said vehicle body, a measuring carriage mounted on running wheels beneath said vehicle body, means connecting said vehicle body and said measuring carriage for movement of the latter from the former, said measuring carriage having a frame subdivided into two relatively angularly deflectable component members pivoted on a common axis and mounted unsprung on the carriage wheels, means actuated by the component members for transmitting their relative angular deflections to said recording equipment, said last-named means including a cable attached at one end to the deflectable end of one component member of the frame, taken over the deflectable end of the other component member of the frame, and then around the common pivot axis of the two component members of the frame, and then to the recording equipment to actuate the same to record the relative level of the two rails, the length of the cable between the measuring carriage and the vehicle body being embodied in a Bowden cable, means for elastically suspending the other end of the cable from the vehicle body, elastically loaded slipper elements on said measuring carriage, and means to transmit measurements determined by said slipper elements to said recording equipment.

2. A track-recording vehicle for measuring and recording data which determine the state of the track including superelevation, comprising running gear and a vehicle body, recording equipment in said vehicle body, a measuring carriage mounted on running wheels beneath said vehicle body, means connecting said vehicle body and said measuring carriage for movement of the latter from the former, said measuring carriage having a frame subdivided into two relatively angularly deflectable component members pivoted on a common axis and mounted unsprung on the carriage wheels, means actuated by the component members for transmitting their relative angular deflections to said recording equipment, an integrating device driven in conformity with the distance travelled by the measuring carriage and controlled by the relative angular deflections of the component members of the frame, the motion representing the computational result of the integration performed by the integrating device being transmitted to a recording element of the recording equipment for recording superelevation whereby said element plots the integral curve of the differential curve representing the relative levels of the rails, elastically loaded slipper elements mounted on said measuring carriage, and means to transmit measurements determined by said slipper elements to said recording equipment.

3. A track recording vehicle as claimed in claim 2 in which the relative angular deflections of the component members of the frame are transmitted to the recording equipment by a cable which is embodied in that section which extends between the measuring carriage and the vehicle body in a Bowden cable, characterised in that the integrating device comprises two counter-rotating discs revolving about a common axis and driven in conformity with the distance travelled by the measuring carriage, the said discs frictionally engaging an integrating wheel arranged edgewise between them and adapted to be axially displaced by the said cable which transmits the relative angular deflection of the two component members of the frame, and that the rotation of the integrating wheel controls the deflection of a recording element which plots the integral curve.

4. A track-recording vehicle for measuring and recording data which determine the state of the track including dynamic variations in level, comprising running gear and a vehicle body, said running gear including at least one pair of wheels which support the vehicle body, recording equipment in said vehicle body, a measuring carriage mounted on running wheels beneath said vehicle body, said carriage and said pair of wheels being mounted for relative vertical movement to measure the dynamic variation in level, means connecting said vehicle body and said measuring carriage for movement of the latter from the former, said measuring carriage having a frame subdivided into two relatively angularly deflectable component members pivoted on a common axis and mounted unsprung on the carriage wheels, means actuated by the component members for transmitting their relative deflections to said recording equipment, means for transmitting the relative movement between the carriage and said pair of wheels to the recording equipment, elastically loaded slipper elements mounted on said measuring carriage, and means to transmit measurements determined by said slipper elements to said recording equipment.

5. A track recording vehicle as claimed in claim 4, characterised in that for the purpose of transmitting the relative vertical movements of measuring carriage and the pair of supporting vehicle wheels two transmission cables are provided, one for each of the two rails respectively, one end of each of the said cables being attached to a linkage between the measuring carriage and one of the said wheels and the other end being elastically suspended from the vehicle body, each of the cables being taken through the recording equipment for the actuation of a recording element coordinated with one of the rails for recording dynamic irregularities in their level, the lengths between the measuring carriage and the vehicle body being embodied in Bowden cables.

6. A track recording vehicle as claimed in claim 5, characterised in that each axle box of the pair of supporting vehicle wheels is provided with a cylindrical bearing surface concentric with the centre line of the same, and that a horizontal cylindrical member of the linkage disposed at right angles to the said centre line is elastically urged into contact with the said bearing surface, the transmission cables being vertically attached to the said cylindrical member.

7. A track recording vehicle as claimed in claim 5, characterised in that both transmission cables are attached at a relative angle of 180° to the linkages with which they are associated and are likewise interconnected over movable pulley attached to a third transmission cable which is taken through the recording equipment and elastically suspended from the vehicle body, the said third cable actuating a recording element of the recording equipment for recording the difference between the dynamic levels of the two rails, the length of the third cable between the measuring carriage and the vehicle body being embodied in a Bowden cable.

References Cited in the file of this patent

UNITED STATES PATENTS

| | | |
|---|---|---|
| 367,708 | Dudley | Aug. 2, 1887 |
| 1,837,633 | Sperry | Dec. 22, 1931 |
| 2,388,683 | Frickey et al. | Nov. 13, 1945 |

FOREIGN PATENTS

| | | |
|---|---|---|
| 880,954 | France | Apr. 12, 1943 |
| 1,016,765 | France | Nov. 21, 1952 |
| 167,602 | Australia | May 6, 1954 |
| 167,529 | Australia | May 6, 1954 |